(12) United States Patent
Rogoll et al.

(10) Patent No.: US 8,304,930 B2
(45) Date of Patent: Nov. 6, 2012

(54) FIELDBUS SYSTEM WITH SHARED REDUNDANCY SYSTEM

(75) Inventors: Gunther Rogoll, Mannheim (DE); Renato Kitchener, West Sussex (GB)

(73) Assignee: Pepperl & Fuchs (DE)

( * ) Notice: Subject to any disclaimer, the term of this patent is extended or adjusted under 35 U.S.C. 154(b) by 762 days.

(21) Appl. No.: 11/989,586

(22) PCT Filed: Jul. 31, 2006

(86) PCT No.: PCT/GB2006/002866
§ 371 (c)(1),
(2), (4) Date: Aug. 6, 2009

(87) PCT Pub. No.: WO2007/012886
PCT Pub. Date: Feb. 1, 2007

(65) Prior Publication Data
US 2009/0315395 A1     Dec. 24, 2009

(30) Foreign Application Priority Data
Jul. 29, 2005  (GB) .................................. 0515552.8

(51) Int. Cl.
*H02J 1/10* (2006.01)
*H02J 9/00* (2006.01)
(52) U.S. Cl. ................. 307/23; 307/18; 307/29; 307/65
(58) Field of Classification Search ............. 307/18, 307/23, 29, 65
See application file for complete search history.

(56) References Cited

U.S. PATENT DOCUMENTS

| | | | |
|---|---|---|---|
| 4,729,086 A | 3/1988 | Lethellier | |
| 6,127,879 A | 10/2000 | Willis et al. | |
| 6,301,133 B1 | 10/2001 | Cuadra et al. | |
| 6,525,915 B1 | 2/2003 | Graube | |
| 6,735,704 B1 | 5/2004 | Butka et al. | |
| 6,768,225 B2 * | 7/2004 | Chang et al. | 307/65 |
| 7,061,141 B2 * | 6/2006 | Yamamoto | 307/65 |
| 7,835,295 B2 * | 11/2010 | Brewer et al. | 370/252 |
| 2005/0008146 A1 | 1/2005 | Chheda et al. | |
| 2005/0046461 A1 | 3/2005 | Huang et al. | |
| 2005/0104734 A1 | 5/2005 | Graube | |

FOREIGN PATENT DOCUMENTS

WO    WO-2005/041484 A1    5/2005

* cited by examiner

*Primary Examiner* — Hal Kaplan
(74) *Attorney, Agent, or Firm* — Lerner, David, Littenberg, Krumholz & Mentlik, LLP

(57) ABSTRACT

A Fieldbus system comprising a plurality of segments each comprising a trunk with its own primary power supply, and a shared redundancy system comprising one or more auxiliary power supplies and monitoring and control means, in which the monitoring and control means is adapted to detect failures in any part of any of the plurality of segments, in which in the event of a failure being detected by the monitoring and control means in any one of the plurality of segments, the monitoring and control means isolates the trunk in that segment from its primary power supply and connects said trunk to one of the one or more auxiliary power supplies, and in which any one of the auxiliary power supplies is connectable to any two or more of the trunks.

29 Claims, 3 Drawing Sheets

FIELDBUS SYSTEM WITH SHARED REDUNDANCY SYSTEM

This invention relates to a Fieldbus system with a shared redundancy system, and to a shared redundancy system for use with a Fieldbus system.

Current redundant Fieldbus power supplies comprise either simplex or discrete power supplies "OR" coupled together. A lower cost alternative is to use clustered simplex power supplies utilizing a single housing and some shared components. Again the power supplies can be "OR" coupled together.

FIG. 1 shows a prior art simplex power supply for a trunk 5, comprising a power source 1, a galvanic or non-galvanic isolated DC-DC converter and/or current limiter 2, used in conjunction with a power conditioner 3 and a terminator 4.

FIG. 2 shows a prior art redundant system in which two power supplies 2a and 2b are provided, and are "OR" coupled together. In this example there is a shared power conditioner and terminator, although each power supply 2a and 2b can be provided with their own power conditioners and terminators.

Whilst the arrangement shown in FIG. 2 is effective, if it is used in a multi segment Fieldbus system of the known type, each segment is provided with its own redundancy feature regardless of whether or not it might be required. This significantly increases the number or size of components, and therefore the cost of manufacture and purchase.

The Present Invention is Intended to Overcome Some of the Above Problems.

Therefore, according to a first aspect of the present invention a Fieldbus system comprises a plurality of segments each comprising a trunk with its own primary power supply, and a shared redundancy system comprising one or more auxiliary power supplies and monitoring and control means, in which the monitoring and control means is adapted to detect failures in any part of any of the plurality of segments, in which in the event of a failure being detected by the monitoring and control means in any one of the plurality of segments, the monitoring and control means isolates the trunk in that segment from its primary power supply and connects said trunk to one of the one or more auxiliary power supplies, and in which any one of the auxiliary power supplies is connectable to any two or more of the trunks.

Therefore the invention provides a Fieldbus system in which one or more auxiliary power supplies can provide a redundancy feature for a greater number of trunks. Thus, each trunk does not need to be provided with its own separate auxiliary power supply, as in known arrangements.

The monitoring and control means can comprise a monitoring circuit adapted to detect a failure on any of the trunks and/or any of the primary power supplies. The monitoring circuit can be adapted to detect voltage failures, current failures, or communications failures on the trunks or the primary power supplies, or failures of components associated with the primary power supplies such as power conditioner failures or terminator failures. The thresholds in performance which determine a fault situation can be predetermined as desired and Incorporated into the monitoring circuit in any of the known ways. Monitoring circuits which can perform these functions are well known and will not be further described here.

The monitoring and control means can further comprise a decision process which in the event of a detected failure acts to isolate any of the trunks from their primary power supplies and connect them to one of the auxiliary power supplies. Again, the means by which such a decision process can be implemented are well known and will not be further described here.

The monitoring and control means can be provided with isolation means adapted to isolate each trunk from its primary power supply, and connection means adapted to connect each trunk to one of the one or more the auxiliary power supplies. In one version of the invention the isolation means can comprise an "OR" diode, and the connection means can comprise a simple isolation switch mounted on a connection between the trunk in question and the auxiliary power supply in question, which connection joins the trunk downstream of the "OR" diode. Thus, in the event of a failure being detected the isolation switch can be closed by the decision process to complete the connection, and when this is done the "OR" diode automatically isolates the trunk from its primary power supply. It will be appreciated that this arrangement will only work with failures Involving a voltage or a current drop.

It will be appreciated that with a plurality of trunks, and more trunks than there are auxiliary power supplies, there may be a significant number of connections between the trunks and the auxiliary power supplies with an associated number of isolation switches. Therefore, in a preferred construction a matrix of isolation switches can be provided.

In an alternative arrangement the isolation means and the connection means can comprise a two-way switch mounted at a junction point between the primary power supply and one of the one or more auxiliary power supplies. With this arrangement, in the event of a failure being detected the two-way switch can be switched from a first position at which it connects the primary power supply to the trunk and a second position at which is connects the auxiliary power supply to the trunk. This arrangement is more effective at fully isolating the trunk from the primary power supply, and can therefore be used with failures which do not involve a voltage or current drop, such as a communications failure or a component failure.

Again, as a significant number of two-way switches may be required, in a preferred construction a matrix of two-way switches can be provided.

It will be appreciated that the trunks can be simplex or discreet in nature, and the invention will work with any arrangement. However, preferably the trunks can be simplex in nature when they are powered by their primary power supply or any of the auxiliary power supplies.

To be practical a simplex trunk should be provided with a power conditioner and a terminator. Therefore, in one arrangement of the invention each of the primary power supplies and each of the auxiliary power supplies can be provided with its own separate power conditioner and/or terminator upstream of the monitoring and control means.

However, in alternative arrangements the trunks can be provided with a power conditioner and/or a terminator downstream of the monitoring and control means, the isolation means and the connection means. Thus, the primary power supply and the auxiliary power supply can utilize common power conditioners and/or terminators, which reduces the number of components required. However, it will be appreciated that if a common power conditioner or terminator fails in use, switching to the auxiliary power supply may not resolve the problem.

The primary power supply and the auxiliary power supply can be powered by separate power sources. However, in one arrangement of the invention a common power source can power both the primary and the auxiliary power supplies.

The monitoring and control means can be provided with an interface means adapted to interface with a computer in order to provide recorded or live data on the performance of any of the plurality of segments or the components of the shared redundancy system. In addition the interface means can be adapted to receive override Instructions so the shared redundancy system can be operated manually.

Further, the monitoring and control means can be provided with diagnostic means adapted to gather data on the status of any part of the Fieldbus system which it can monitor. A known physical layer diagnostic system could be included here. Such systems are known and are not further described here.

However, in one version of the invention the monitoring and control means can be provided with an output monitoring circuit adapted to monitor one or more of the trunks downstream of the monitoring and control means, the isolation means and the connection means. This allows the monitoring and control means to assess the whole system's health by pulse switching or changing over the whole switching matrix. In one version of the Invention the monitoring circuit can be adapted to continuously do this so it can provide continuous data on the operational status or readiness of the auxiliary power supplies.

However, doing this means continuously, or periodically, connecting the auxiliary power supplies to the trunks. Therefore, in an alternative construction the monitoring and control means can be provided with a dummy load to which the auxiliary power supplies can be connected, and the output monitoring circuit can be adapted to assess the auxiliary power supplies when they are connected to the dummy load.

Physically the invention can be performed in various ways, and various components as described above can be used to facilitate the features of the invention. However, in a preferred construction the Fieldbus system can comprise a support means which is connected to one or more power sources, and which is provided with a plurality of trunk outlets. A plurality of primary simplex segment power supply modules can be removably mounted on the support means, each one between one of the power sources and one of the trunk outlets. The primary simplex segment power supply modules convert the power source into Fieldbus, and each comprise the customary power conditioning and termination features. As the modules are removable only the required number need be provided, and each module can be removed and replaced if faulty without affecting the rest of the system. One or more auxiliary simplex segment power supply modules can also be removably mounted on the support means, and they can be disposed between one of the power sources and any two or more of the trunk outlets in the event of a failure being detected, as described above.

A monitoring and control module can be removably mounted on the support means, and can contain the monitoring and control means, the monitoring circuit, the decision process, the isolation means, the connection means and the diagnostic means, as described above. In an alternative constructions one or more of these features of the invention can be carried within the support means itself or within the primary simplex segment power supply modules.

The support means can also be provided with inputs for a diagnostics interface link and host connections for the trunks, such that the support means can be integrated into a fully monitored Fieldbus system. Preferably the support means can comprise a backplane.

Any of the switching, power conditioning and terminating components described above usually have undisclosed failure conditions, which is to say they can fall in use without giving any outward indication as such, until a failed attempt is made to change their status. Switches are most prone to such failures as they can stick in one position or another. Therefore, in one version of the invention the isolation switches or the two-way switches described above can comprise a pair of switches in series, or a pair of switches in parallel, or indeed two pairs of switches in series mounted in parallel with one another. Such arrangements are known and provide various redundancy advantages. Such arrangements can also facilitate the switching of an auxiliary power supply onto a dummy load as described above, and it is possible with these arrangements to test various switches without disrupting the power supply.

Furthermore, these types of redundancy arrangements can be provided for any of the terminators and/or the power conditioners mentioned above, in any of the known ways. Again, such arrangements allow for the standby components to be tested for readiness at any time.

The invention relates to a Fieldbus system comprising a plurality of segments and a shared redundancy system. However, it will be appreciated that it would be possible to retro-fit a shared redundancy system as described above to an existing Fieldbus system.

Therefore, according to a second aspect of the present invention a shared redundancy system for a Fieldbus system comprising a plurality of segments each comprising a trunk with its own primary power supply, comprises one or more auxiliary power supplies and monitoring and control means, in which the monitoring and control means is adapted to be connected to a plurality of segments of a Fieldbus system with which the shared redundancy system is used, and to detect failures in any part of any of the plurality of segments, in which in the event of a failure being detected by the monitoring and control means in any one of the plurality of segments, the monitoring and control means isolates the trunk in that segment from its primary power supply and connects said trunk to one of the one or more auxiliary power supplies, and in which any one of the auxiliary power supplies is connectable to any two or more of the trunks.

The invention will now be described by way of example and with reference to the accompanying drawings, in which.

Figure 1:
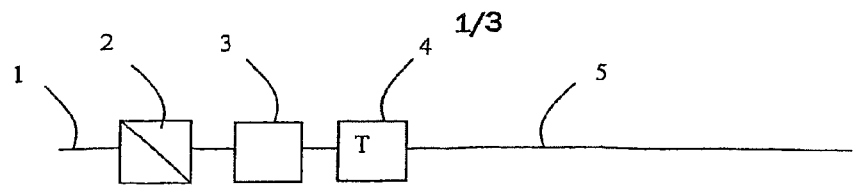
FIG. 1 is diagrammatic view of a prior art simplex trunk.
Figure 2:
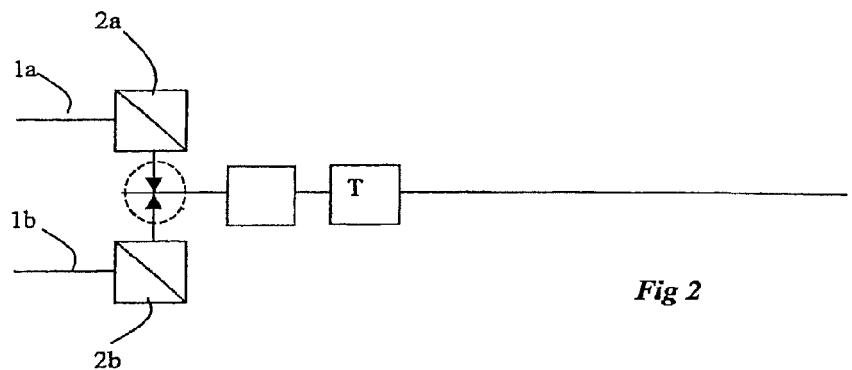
FIG. 2 is a diagrammatic view of a prior art simplex trunk provided with a redundant power supply.
Figure 3:
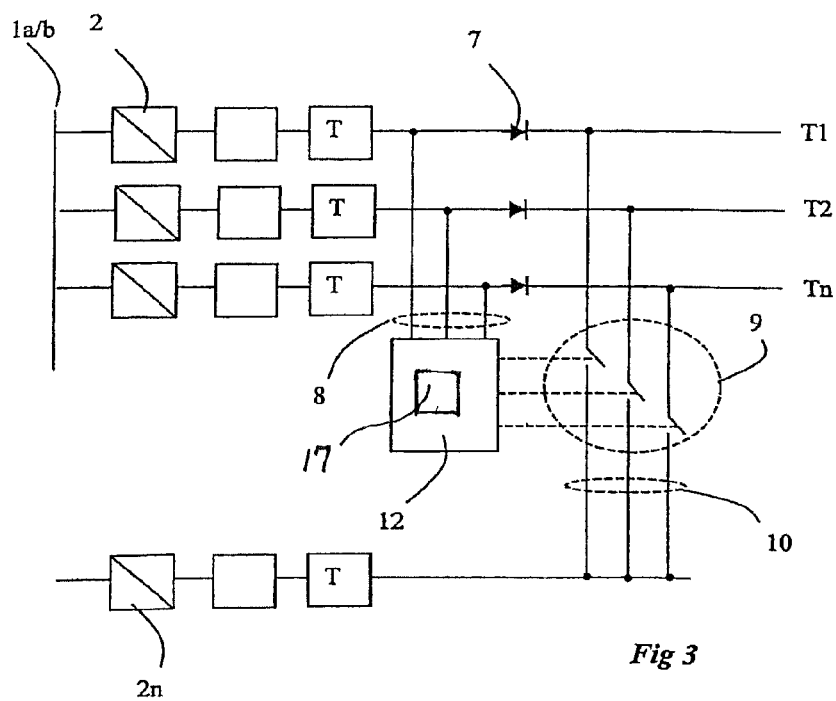
FIG. 3 is a diagrammatic view of a first Fieldbus system according to the present invention.

As shown in FIG. 3 a Fieldbus system comprises a plurality of segments each comprising a trunk T1-Tn provided with its own primary power supply 2, and a shared redundancy system comprising one or more auxiliary power supplies, in the form of single auxiliary power supply 2*n*, and monitoring and control means 12. The monitoring and control means 12 is adapted to detect particular failures in any of the segments as described below, and in the event of a failure being detected by the monitoring and control means 12 in any one of the segments the monitoring and control means 12 isolates the trunk T1, T2 or Tn in that segment from its primary power supply 2 and connects said trunk T1, T2 or Tn to one of the one more auxiliary power supplies (2*n*), as also described in further detail below. As is clear from FIG. 3 the auxiliary power supply 2*n* is connectable to any of the trunks T1, T2 or Tn.

A bulk power source 1a/b is provided to both the primary power supplies 2 and the auxiliary power supply 2n. The primary power supplies 2 and the auxiliary power supply 2n are all provided with their own power conditioners and terminators as shown in FIG. 3, and as such they constitute simplex power supplies of the known type. (The bulk power source 1a/b is referred to as 1a/b to indicate that it could be a single bulk power source or two separate power sources, one for the primary power supplies 2 and another for the auxiliary power supply 2n.)

The monitoring and control means 12 comprises a monitoring circuit adapted to detect a failure in any of the segments. The monitoring circuit is connected to each of the trunks T1-Tn, as indicated at 8, and is adapted to actively monitor the trunks T1-Tn such that voltage failures and current failures in any of the segments are detectable. Such failures could be caused by short circuits in the trunks T1-Tn or failures in any part of the primary power supplies 2. The thresholds in performance which determine a fault situation are pre-determined by being pre-programmed into the monitoring circuit. Such active monitoring circuits are known so the monitoring circuit is not further described here.

The monitoring and control means 12 further comprises a decision process 17 which in the event of a failure being detected in any of the segments by the monitoring circuit, acts to isolate the trunk T1, T2 or Tn in that segment from its primary power supply 2 and to connect it to the auxiliary power supply 2n. Again, the means by which such a decision process 17 can be implemented are well known, so the decision process 17 will not be further described here.

Each of the trunks T1-Tn is provided with an "OR" diode 7, and separate connections are formed between the auxiliary power supply 2n and each of the trunks T1-Tn, as indicated at 10. Each connection 10 has an isolation switch, indicated at 9, mounted thereon, which are switchable by the monitoring and control means 12. The isolation switches 9 are formed as a matrix of isolation switches for convenience.

Therefore, in use the bulk power supply 1a/b provides power to the primary power supplies 2 and the auxiliary power supply 2n. The primary power supplies 2 condition the electrical power as appropriate for the trunks T1-Tn, and the trunks T1-Tn support various loads (not shown). The monitoring and control means 12 actively monitors the segments for any failures.

In the event of a failure occurring on one of the segments it is detected by the monitoring and control means 12 via the monitoring circuit. The decision process then operates the appropriate isolation switch 9 for that segment, which introduces the auxiliary power supply 2n to the trunk T1, T2 or Tn in question. As a result of the greater voltage or current being supplied by the auxiliary power supply 2n to the trunk, the primary power supply 2 is isolated from the trunk by the "OR" diode 7. Thus, power is maintained to the trunk T1, T2 or Tn in question after a failure, just as would be the case with a known redundancy arrangements. However, it will be appreciated that in the case of FIG. 3, three trunks have a shared redundancy system comprising a single auxiliary power supply 2n.

Figure 4:
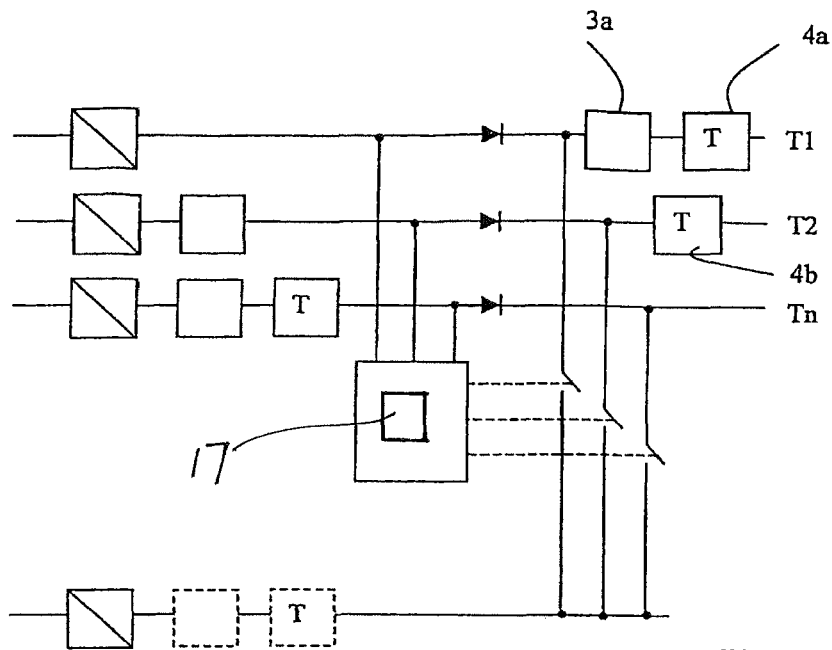
FIG. 4 is a diagrammatic view of a second Fieldbus system according to the present invention.
Figure 5:
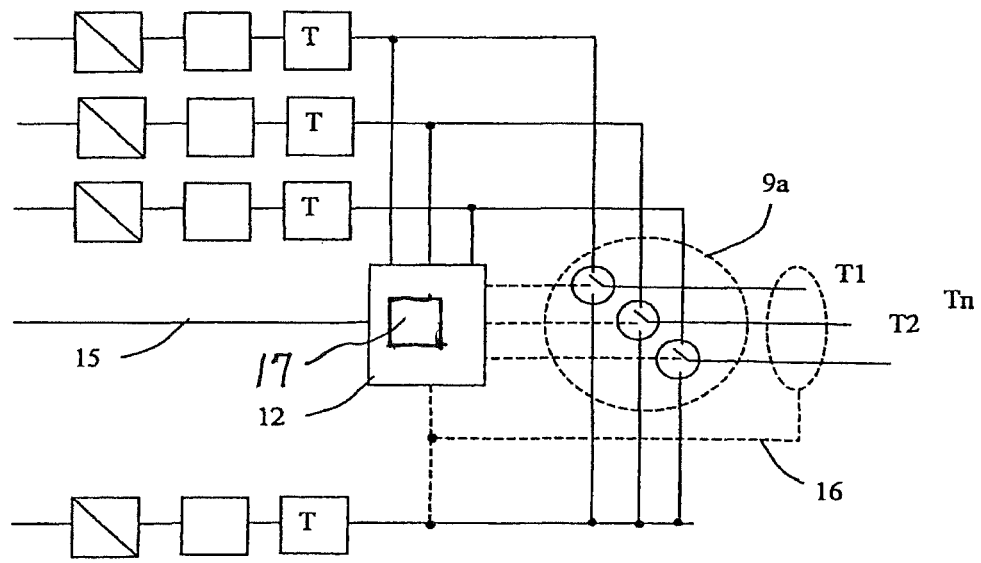
FIG. 5 is a diagrammatic view of a third Fieldbus system according to the present invention.
Figure 6:
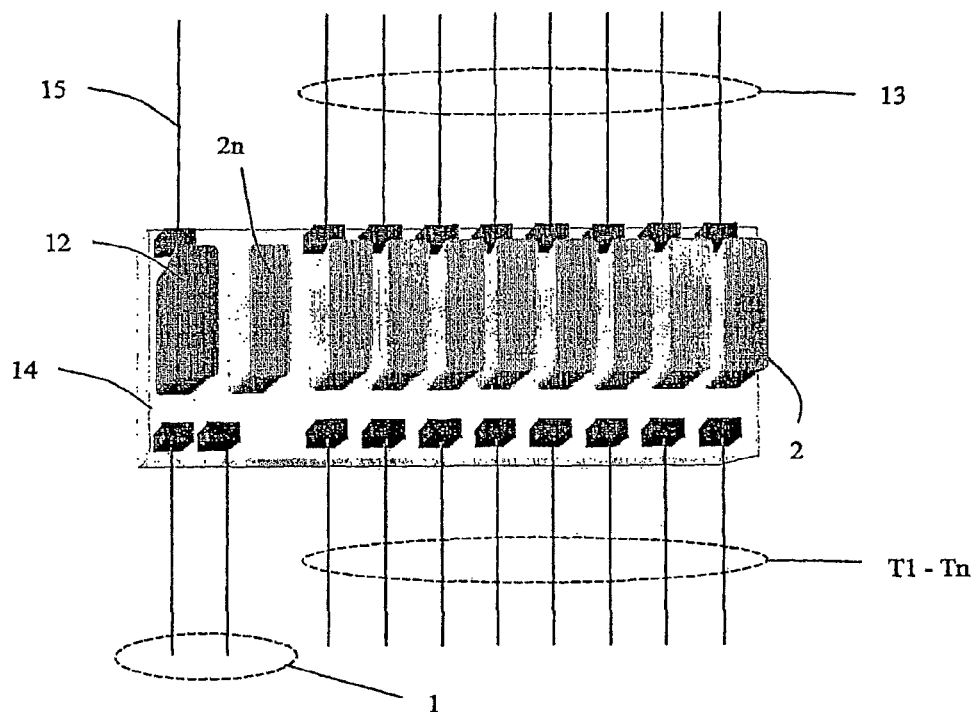
FIG. 6 is a diagrammatic view of a fourth Fieldbus system according to the present invention.

FIGS. 4 to 6 show other advantageous arrangements of the present invention.

FIG. 4 is an illustration of other ways to arrange the components of the Invention to reduce their number. In FIG. 4 a Fieldbus system is basically the same as the Fieldbus system shown in FIG. 3, except that some of the components are shared between the primary power supplies and the auxiliary power supply.

Of the three trunks T1-Tn shown, trunk Tn is identical to the trunks T1-Tn shown in FIG. 3, in that the power conditioner and the terminator are provided upstream of the connection to the auxiliary power supply. In such an arrangement the auxiliary power supply is provided with its own power conditioner and terminator, which are sown in hashed lines in FIG. 4.

However, trunk T1 has a power conditioner 3a and a terminator 4a downstream of its connection to the auxiliary power supply. As such, the auxiliary power supply need not have its own power conditioner and terminator as it can utilize these on the trunk Ti.

In addition, trunk T2 has a terminator 4b downstream of its connection to the auxiliary power supply. As such, the auxiliary power supply need only have a power conditioner, as it can utilize the terminator on the trunk T2.

Clearly any one of these arrangements can be used on all the trunks in a Fieldbus system or just some of them, as required. However, whilst the arrangements on trunks T1 and T2 are a possibility, it will be appreciated that if a fault occurs in any of the shared components, switching to the auxiliary power supply may not resolve the problem.

FIG. 5 shows a Fieldbus system which provides the same functions as the Fieldbus system shown in FIG. 3, except that a different arrangement is used to switch between the primary power supplies and the auxiliary power supply, which allows for further faults to be resolved in use.

In FIG. 5 two-way switches 9a are mounted at junction points between the trunks T1-Tn and the auxiliary power supply. The switches 9a are formed into a switching matrix.

Thus, when a failure is detected by the monitoring and control means, it switches the appropriate two-way switch to isolate the trunk T1, T2 or Tn in question from its primary power supply and connect it to the auxiliary power supply. This provides a more complete isolation of the trunk from its primary power supply than the use of an "OR" diode as shown in FIG. 3, and as such the shared redundancy system can deal with over voltage scenarios, and failures which do not involve a voltage or a current drop.

Thus, the monitoring and control means in FIG. 5 is adapted to detect not only voltage and current failures in the segments, but also communications failures, power conditioner failures and terminator failures. If one of these failures which does not involve a voltage or current drop occurs, the switching of the two-way switch will fully isolate the trunk T1, T2 or Tn in question from its primary power supply, which may not be the case if the "OR" diode arrangement shown in FIG. 3 were used.

In addition, the monitoring and control means in FIG. 5 is provided with an interface means 15 which is adapted to interface with a computer in order to provide recorded and live data on the performance of any of the plurality of segments or the components of the shared redundancy system. In addition the interface means 15 can be used to transmit override instructions so the shared redundancy system can be operated manually. The means to implement such an interface means 15 are well known and are therefore not further described here.

Further, the monitoring and control means is also provided with diagnostic means in the form of output monitoring circuit, indicated by hashed lines at 16. The output monitoring circuit 16 monitors the trunks T1-Tn downstream of the switches 9a. The monitoring and control means is adapted to pulse switch or change over the whole switching matrix 9a in order to assess the whole system's health from the data provided by the output monitoring circuit 16.

FIG. 6 shows an advantageous physical arrangement of the components of the invention. In FIG. 6 a backplane 14 is connected to a common power source, indicated at 1, and is provided with eight trunk outlets, each connected to a trunk T1-Tn. Eight primary-simplex segment power supply modules 2 are removably mounted on the backplane 14, each one arranged between the common power source 1 and one of the trunk outlets. The primary simplex segment power supply modules 2 convert the common power source 1 into Fieldbus, and each comprise the customary power conditioning and termination features diagrammatically shown in FIGS. 3 to 5 but not visible in FIG. 6. An auxiliary simplex segment power supply module 2n is also removably mounted on the backplane 14, and is integrated into the circuitry on the backplane 14 such that it is disposable between the common power source 1 and any of the trunk outlets in the event of a failure being detected, as described above. The auxiliary simplex power supply module is also provided with the customary power conditioning and termination features diagrammatically shown in FIGS. 3 to 5 but not visible in FIG. 6

A monitoring and control module 12 is also removably mounted on the backplane 14 and contains the monitoring and control means, the monitoring circuit, the decision process 17, the isolation means, the connection means and the diagnostic means, as described above.

The backplane 14 is also provided with inputs for a diagnostics interface link 15 and host connections for the trunks, as indicated at 13, such that the backplane 14 is integratable into a fully monitored Fieldbus system.

The arrangement shown in FIG. 6 is advantageous because the modules 2, 2n and 12 are readily removable if they fail. In addition, only the required number of primary simplex segment power supply modules 2 need be provided for the number of in use trunks, and each of these modules 2 can be removed and replaced if faulty without affecting the rest of the system.

The invention also includes a shared redundancy system for use with an existing Fieldbus system, and FIG. 6 provides support for such a system in the form of backplane 14, with its auxiliary simplex segment power supply module 2n and monitoring and control module 12, which can be integrated into an existing Fieldbus system.

Figure 7:
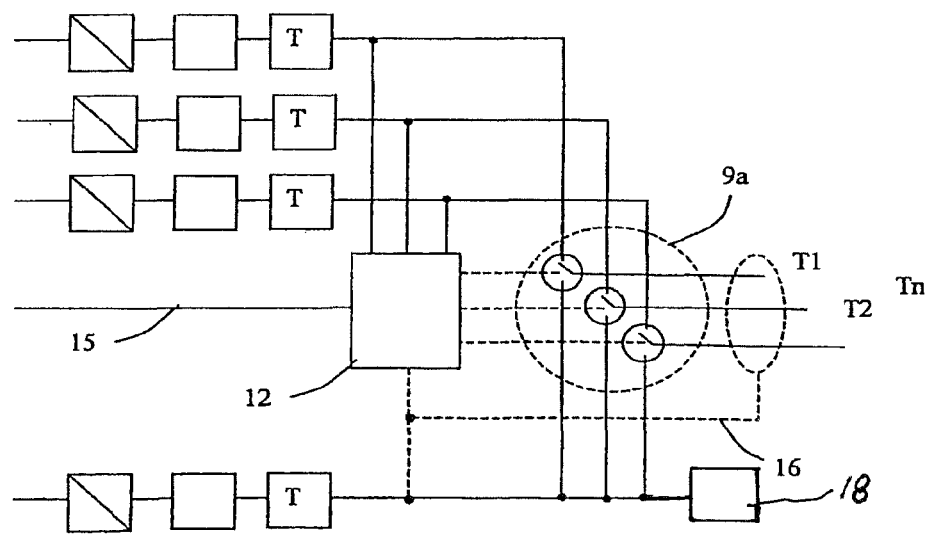
FIG. 7 is a digrammatic view of a fifth Fieldbus system of the present invention.

The embodiments described above can be altered without departing from the scope of claim 1. In particular, in one alternative embodiment shown in FIG. 7 a Fieldbus system like that shown in FIG. 5 is also provided with a dummy load 18 to which the auxiliary power supply can be connected, and the output monitoring circuit is adapted to asses the auxiliary power supply when it is connected to the dummy load 18. This arrangement avoids the need to connect the auxiliary power supply to one of the actual trunks to fully test it.

In another alternative embodiment (not shown) a Fieldbus system like that shown in FIG. 5 has a monitoring and control means which is adapted to continuously pulse switch or change over the switching matrix, in order to provide continuous data on the operational status or readiness of the auxiliary power supply.

In other alternative embodiments (not shown) Fieldbus systems like that shown in FIG. 5 have further redundancy incorporated into the switching matrix in the form of pairs of two-way switches in series, pairs of two-way switches in parallel, or two pairs of two-way switches in series which are in parallel with one another. Such arrangements are known and provide various redundancy advantages. Such arrangements allow for undisclosed failure of any of the switches to be overcome. They also facilitate the switching of the auxiliary power supply onto a dummy load as described above, and it is possible with these arrangements to test various switches without disrupting the power supply.

In other alternative embodiments (not shown) Fieldbus systems like that shown in FIG. 5 have further redundancy incorporated into the components associated with the primary and/or the auxiliary power supplies in the form of auxiliary power conditioners and/or terminators. Such arrangements are also known.

In one further alternative embodiment (not shown) a Fieldbus system like that shown in FIG. 5 has a monitoring and control means adapted to directly monitor the primary power sources rather than the trunks.

Therefore, a Fieldbus system, and a shared redundancy system for a Fieldbus system, are provided which significantly reduce the number of components required to provide adequate redundancy.

The invention claimed is:

1. A Fieldbus system comprising a plurality of segments each comprising a trunk with its own primary power supply, and a shared redundancy system comprising one or more auxiliary power supplies and monitoring and control means, in which the monitoring and control means is adapted to detect failures in any part of any of the plurality of segments, in which in the event of a failure being detected by the monitoring and control means in any one of the plurality of segments, the monitoring and control means isolates the trunk in that segment from its primary power supply and connects said trunk to one of the one or more auxiliary power supplies, and in which any one of the auxiliary power supplies is connectable to any two or more of the trunks.

2. A Fieldbus system as claimed in claim 1 in which the monitoring and control means comprises a monitoring circuit adapted to detect voltage and/or current failures in any part of any of the plurality of segments.

3. A Fieldbus system as claimed in claim 2 in which the monitoring and control means comprises a decision process which in the event of a failure being detected by the monitoring circuit in any one of the plurality of segments acts to isolate the trunk in that segment from its primary power supply and connect said trunk to one of the one or more auxiliary power supplies.

4. A Fieldbus system as claimed in claim 3 in which the monitoring and control means is provided with isolation means adapted to isolate each trunk from its primary power supply, and connection means adapted to connect each trunk to one of the one or more the auxiliary power supplies.

5. A Fieldbus system as claimed in claim 4 in which the isolation means comprises an "OR" diode mounted downstream of each primary power supply, in which the connection means for each trunk comprises an isolation switch mounted on a connection between that trunk and one of the one or more auxiliary power supplies, in which the connection joins each trunk downstream of the associated "OR" diode.

6. A Fieldbus system as claimed in claim 5 in which the isolation switches are formed into a matrix of isolation switches.

7. A Fieldbus system as claimed in claim 4 in which the isolation means and the connection means for each trunk comprises a two-way switch mounted at a junction point between the primary power supply and one of the one or more auxiliary power supplies, in which the two-way switch has a first position at which it connects the primary power supply to the trunk and a second position at which is connects the auxiliary power supply to the trunk.

8. A Fieldbus system as claimed in claim 7 in which the two-way switches are formed into a matrix of two-way switches.

9. A Fieldbus system as claimed in claim 6 or 8 in which each of the primary power supplies and each of the auxiliary power supplies is provided with its own separate power conditioner and/or terminator upstream of the monitoring and control means.

10. A Fieldbus system as claimed in claim 9, in which the monitoring circuit is adapted to detect communications failures and/or power conditioner failures and/or terminator failures in any part of any of the plurality of segments.

11. A Fieldbus system as claimed in claim 6 or 8 in which one or more of the trunks is provided with a common power conditioner and/or terminator downstream of the isolation means and the connection means.

12. A Fieldbus system as claimed in claim 11, in which the monitoring circuit is adapted to detect communications failures and/or power conditioner failures and/or terminator failures in any part of any of the plurality of segments.

13. A Fieldbus system as claimed in claim 6 or 8 in which each isolation switch or two-way switch comprises a pair of switches in series or a pair of switches in parallel, or a two pairs of switches in series mounted in parallel with one another.

14. A Fieldbus system as claimed in claim 1 in which the plurality of primary power supplies and the one or more auxiliary power supplies are powered by the same bulk power source.

15. A Fieldbus system as claimed in claim 1 in which the plurality of primary power supplies are powered by a first power source, and in which the one or more auxiliary power supplies are powered by a second power source.

16. A Fieldbus system as claimed in claim 1 in which the monitoring and control means is provided with an interface means adapted to interface with a computer with which the Fieldbus system is used, in order to provide recorded and/or live data on the performance of any of the plurality of segments or the shared redundancy system.

17. A Fieldbus system as claimed in claim 16 in which the interface means is adapted to receive override instructions so the shared redundancy system is manually operable.

18. A Fieldbus system as claimed claim 1 in which the monitoring and control means is provided with diagnostic means adapted to gather data on the status of any part of the Fieldbus system.

19. A Fieldbus system as claimed in claim 18 in which the diagnostic means comprises an output monitoring circuit adapted to monitor one or more of the trunks downstream of the monitoring and control means.

20. A Fieldbus system as claimed in claim 19, in which the isolation switches are formed into a matrix of isolation switches in which the monitoring and control means is adapted to pulse switch or change over the matrix of switches to gather data from the output monitoring circuit on the status of one or more of the one or more auxiliary power supplies.

21. A Fieldbus system as claimed in any of claims 16 to 20 in which the monitoring and control means is provided with a dummy load to which one or more of the one or more auxiliary power supplies is connectable, and in which the diagnostic means is adapted to gather data on the status of said one or more auxiliary power supplies when they are connected to the dummy load.

22. A Fieldbus system as claimed in claim 19, in which the two-way switches are formed into a matrix of two-way switches, in which the monitoring and control means is adapted to pulse switch or change over the matrix of switches to gather data from the output monitoring circuit on the status of one or more of the one or more auxiliary power supplies.

23. A Fieldbus system as claimed in claim 1 in which the Fieldbus system comprises a support means provided with one or more power sources, a plurality of trunk outlets, a plurality of primary simplex segment power supply modules removably mounted thereon, one or more auxiliary simplex segment power supply modules removably mounted thereon and a monitoring and control module removably mounted thereon, in which each of the plurality of primary simplex segment power supply modules is disposed between one of the one or more power sources and one of the trunk outlets, and in which the one or more auxiliary simplex segment power supply modules are disposable between one of the one or more power sources and any two or more of the trunk outlets in the event of a failure being detected by the monitoring and control means in any one of the plurality of segments.

24. A Fieldbus system as claimed in claim 23 in which each of the plurality of primary simplex segment power supply modules contains a power conditioner and a terminator.

25. A Fieldbus system as claimed in claim 20 or 24 in which the monitoring and control means is provided with diagnostic means adapted to gather data on the status of any part of the Fieldbus system in which the monitoring and control module contains the monitoring and control means, the monitoring circuit, the decision process, the isolation means, the connection means and the diagnostic means.

26. A Fieldbus system as claimed in claim 20 or 24 in which the monitoring and control means is provided with diagnostic means adapted to gather data on the status of any part of the Fieldbus system in which the one or more of the monitoring and control means, the monitoring circuit, the decision process, the isolation means, the connection means and the diagnostic means are carried within the support means.

27. A Fieldbus system as claimed in claim 23 in which the support means is provided with diagnostics interface link input and host connections for the trunks.

28. A Fieldbus system as claimed claim 23 in which the support means comprises a backplane.

29. A shared redundancy system for a Fieldbus system comprising a plurality of segments each comprising a trunk with its own primary power supply, comprising one or more auxiliary power supplies and monitoring and control means, in which the monitoring and control means is adapted to be connected to a plurality of segments of a Fieldbus system with which the shared redundancy system is used, and to detect failures in any part of any of the plurality of segments, in which in the event of a failure being detected by the monitoring and control means in any one of the plurality of segments, the monitoring and control means isolates the trunk in that segment from its primary power supply and connects said trunk to one of the one or more auxiliary power supplies, and in which any one of the auxiliary power supplies is connectable to any two or more of the trunks.

* * * * *

UNITED STATES PATENT AND TRADEMARK OFFICE
CERTIFICATE OF CORRECTION

| | | |
|---|---|---|
| PATENT NO. | : 8,304,930 B2 | Page 1 of 2 |
| APPLICATION NO. | : 11/989586 | |
| DATED | : November 6, 2012 | |
| INVENTOR(S) | : Gunther Rogoll and Renato Kitchener | |

It is certified that error appears in the above-identified patent and that said Letters Patent is hereby corrected as shown below:

In the Specification:
Column 1, line 22, "their" should read --its--
Column 1, line 24, "multi segment" should read --multi-segment--
Column 1, line 29, "Present Invention is Intended to Overcome Some of the Above Problems" should read --present invention is intended to overcome some of the above problems--
Column 1, line 60, "Incorporated" should read --incorporated--
Column 2, line 7, after "more" delete the word "the"
Column 2, line 18, "Involving" should read --involving--
Column 2, line 32, "is" should read --it--
Column 3, line 4, "Instructions" should read --instructions--
Column 3, line 18, "Invention" should read --invention--
Column 4, line 39, after "is" insert --a--
Column 4, line 50, "digrammatic" should read --diagrammatic--
Column 5, line 36, "are" should read --is--
Column 5, line 56, before "known" delete "a"
Column 5, line 63, "Invention" should read --invention--
Column 6, line 6, "sown" should read --shown--
Column 6, line 39, "over voltage" should read --over-voltage--
Column 6, line 61, after "of" insert --an--
Column 7, line 10, "comprise" should read --comprises--
Column 7, line 34, "in use" should read --in-use--
Column 7, line 48, "asses" should be --assess--

In the Claims:
Column 8, line 46, after "more" delete the word "the"
Column 8, line 59, "comprises" should read --comprise--
Column 8, line 63, "is" should read --it--
Column 9, line 3, "is" should read --are--
Column 9, line 3, "its" should read --their--

Signed and Sealed this
Tenth Day of June, 2014

Michelle K. Lee
*Deputy Director of the United States Patent and Trademark Office*

CERTIFICATE OF CORRECTION (continued)
U.S. Pat. No. 8,304,930 B2

Column 9, line 11, "is" should read --are--
Column 9, line 20, before "two" delete "a"
Column 9, line 40, after "claimed" insert --in--
Column 9, line 54, "16" should read --18--
Column 9, line 57, "is" should read --are--
Column 10, line 26, "20" should read --23--
Column 10, line 33, "20" should read --23--
Column 10, line 43, after "claimed" insert --in--